3,388,126
SYNTHESIS OF SULFENAMIDES IN AQUEOUS-ORGANIC SOLVENT MIXTURES
Carl Arthur Harman, St. Albans, W. Va., assignor to Monsanto Company, St. Louis, Mo., a corporation of Delaware
No Drawing. Filed Oct. 27, 1965, Ser. No. 505,415
16 Claims. (Cl. 260—247.1)

The invention relates to an improved method for the synthesis of sulfenamides. More particularly, the invention relates to an aqueous-organic solvent mixture for the synthesis of sulfenamides.

An object of this invention is to provide an improved method for the synthesis of sulfenamides. Other objects will become apparent as the description of the invention proceeds. The objects of the invention are accomplished by carrying out the entire reaction of a primary or secondary amine, aqueous sodium hypochlorite and either 2-mercaptobenzothiazole, a metal salt of 2-mercaptobenzothiazole, or benzothiazyl disulfide in a medium of an aqueous-organic solvent mixture.

Certain sulfenamides are known accelerators for the vulcanization of rubber. Some examples of these compounds are N-cyclohexyl-2-benzothiazole sulfenamide, N-tert.-butyl-2-benzothiazole sulfenamide, 2-(hexahydroazepin-1-ylthio)benzothiazole, 2-(morpholinothio)benzothiazole, and 2-(2,6-dimethyl-4-morpholinothio)benzothiazole. The compound 2-(2,6-dimethyl-4-morpholinothio)benzothiazole is represented by the formula

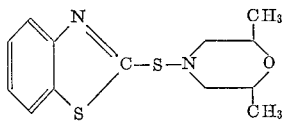

The preparation of the sulfenamides probably involves formation of an N-chloroamine from the reaction of an amine with sodium hypochlorite. The N-chloroamine reacts immediately with either 2-mercaptobenzothiazole, a salt of 2-mercaptobenzothiazole, or benzothiazyl disulfide to form the sulfenamide. Prior workers often found it expedient to carry out the reactions independently. An excessive amount of amine was used in the first step of the old reactions. Excesses of 50% to 150% amine are not uncommon in the prior art. A recovery step is required when excessive amounts of amine are used. Long reaction times and low reaction temperatures (below 25° C.) were believed essential for the first step of the process. The long reaction times are required in the old two-step reaction in order to control the temperature of the exothermic reaction of the amine and sodium hypochlorite and to prevent chloroamine decomposition. In the past, the second step of the reaction was carried out under anhydrous conditions since water was demonstrated to be detrimental. Kinstler in U.S. Patent 3,055,909, Cl. 260–306.6 (Sept. 25, 1962), synthesizes N-cyclohexyl-2-benzothiazole sulfenamide by preparing a chloroamine in a dual-phase reaction medium of water and organic solvent at a low temperature of about 0° C. to about 10° C. The chloroamine and organic solvent are then removed from the brine to react the chloroamine in the second step with 2-mercaptobenzothiazole or benzothiazyl disulfide to form N-cyclohexyl-2-benzothiazole sulfenamide in an organic solvent. This necessitates separation of the brine layer after the first step, then after the second step of the reaction, saturation of the reaction mixture with ammonia gas to recover the excess amine.

I have found an improvement in the synthesis of sulfenamides which allows the complete reaction of a primary or secondary amine, aqueous sodium hypochlorite and either 2-mercaptobenzothiazole, a metal salt of 2-mercaptobenzothiazole, or benzothiazyl disulfide to be carried out in one step at higher temperatures and shorter reaction times than believed feasible in the past. The use of ammonia is not necessary in this one-step process. Neither preliminary preparation nor isolation of a chloroamine is necessary in this one-step process. The excessive amounts of amine used in the past are avoided. The reaction is stirred easily with water present. Without water, stirring is often difficult. The process of this invention furnishes more economical and quality-improved products. The yields are nearly quantitative. The storage stability of the products is improved. The products have good flaking characteristics which is a desirable property for rubber additives.

The products are conveniently isolated either by vacuum distillation of the relatively low proportion of solvent used, by conventional recrystallization or by azeotropically distilling solvent from a quantity of water to provide a water slurry of crystalline product.

The organic solvent used in the solvent mixture of this invention should be inert to the reactants used and insoluble in water. Organic solvents which can be used in this mixture are, for example, carbon tetrachloride, perchloroethylene, trichloroethylene, benzene, toluene, xylene, thiophene, nitrobenzene, and halogenated aromatic hydrocarbons. A mixture of monochlorobenzene and water is the preferred solvent mixture for this invention because of their large density difference. There should be at least enough of the organic solvent present in the mixture to dissolve a major portion of the product at the reaction temperature. When the product is isolated by vacuum distillation of the organic solvent, it is essential to have enough of the organic solvent present in the mixture to completely dissolve the product at the reaction temperature. A completely dissolved product is necessary to effectively separate the product from the water and water-soluble wastes. This is substantially accomplished using about 80 parts organic solvent to 100 parts product. Alliger in U.S. Patent 2,581,921, Cl. 260–306.6 (Jan. 8, 1952) discloses a sulfenamide preparation in water where a relatively water-insoluble organic solvent is used as a filter aid. A dissolved product is neither desired nor an object of the Alliger work.

From 0 to about 50 parts water to 100 parts organic solvent may be used for the initial solvent mixture of this invention. All of the water in the final mixture can come from the aqueous sodium hypochlorite. For example, in preparing 2-(morpholinothio)benzothiazole, it is preferred to have water from the aqueous sodium hypochlorite only. The presence of isopropanol in the initial solvent for the process of the invention making 2-(morpholinothio)benzothiazole from 2-mercaptobenzothiazole gives a product free of impurities.

Reaction temperatures of about 40° C. to about 100° C. can be used in the process of this invention. A temperature of about 70° C. is preferred to provide a reasonably rapid reaction rate.

On a mole ratio basis, using one mole of 2-mercaptobenzothiazole or sodium-2-mercaptobenzothiazole, a mere excess of about 3% to 10% or 1.03 to 1.1 moles of amine is required. Thus, the need to recover excess amine is avoided. About 20% to about 40% excess sodium hypochlorite or about 1.2 to 1.4 moles is desirable for the process of this invention. The amount of amine is doubled to 2.06 to 2.2 moles when one mole of benzothiazyl disulfide is a starting material.

The following examples illustrate the invention in more detail.

Example I

This example illustrates the synthesis of 2-(2,6-dimethyl-4-morpholinothio)benzothiazole from 2-mercaptobenzothiazole in a solvent mixture of monochlorobenzene and water. To prepare 2-(2,6-dimethyl-4-morpholinothio) benzothiazole, 86 grams 97% assay (0.50 mole) 2-mercaptobenzothiazole, 120 grams monochlorobenzene and 60.5 grams (0.525 mole) 2,6-dimethyl morpholine are charged to a one-liter, round-bottom flask equipped with stirrer, thermometer, reflux condenser, liquid feed tube, and heating mantle. The mixture is stirred and heated to 53° C. The heat is removed, and 416 grams 10.75% (0.60 mole) aqueous sodium hypochlorite is added to the stirring mixture over a 42-minute period. A temperature of 53° to 74° C. is maintained during this period by applying or removing heat. The mixture is then stirred for thirty additional minutes. Three grams $Na_2SO_3$ dissolved in 100 grams hot water is added, and the mixture is stirred for five minutes. The mixture is allowed to settle, and the lower layer containing the product and monochlorobenzene solvent is separated. The product layer is washed twice with 150-gram portions of water at 65° to 70° C. The washed product solution is then transferred to a 500 ml. vacuum still. The solvent is distilled under increasing temperature and vacuum until no condensate is obtained at a pot temperature of 108° C. and pressure of 20 mm. Hg. The product weighs 140 grams and can be cast, flaked or prilled to the desired form. The product 2-(2,6-dimethyl-4-morpholinothio)benzothiazole melts at 93° C. and contains no visible insoluble matter in methanol. The yield is 100% based on 2-mercaptobenzothiazole.

Example II

This example illustrates the synthesis of 2-(2,6-dimethyl-4-morpholinothio)benzothiazole from benzothiazyl disulfide in a solvent mixture of monochlorobenzene and water. To prepare 2-(2,6-dimethyl-4-morpholinothio)benzothiazole, 28 grams water, 104.5 grams 95.5% assay (0.30 mole) benzothiazyl disulfide, and 135 grams monochlorobenzene are charged to a one-liter, round-bottom flask equipped with a stirrer, thermometer, reflux condenser liquid feed tube, and heating mantle. The mixture is stirred, and 72.5 grams (0.63 mole) 2,6-dimethyl morpholine is charged to the mixture. Stirring is continued, and the mixture is heated to 55° C. The heat is removed, and 192 grams 14.0% sodium hypochlorite (0.36 mole) is added to the stirring mixture over a fifty-minute period at 55° to 75° C. Heat is applied to or removed from the mixture as required. The mixture is then stirred for thirty additional minutes at 72° to 74° C. Then four grams $Na_2SO_3$ dissolved in 150 grams hot water is added, and the mixture is stirred five minutes. The layers separate, and the lower layer containing the product and organic solvent is isolated and washed twice with 225-gram portions of water at 65° to 70° C. The washed product solution is transferred to a 500-ml. vacuum still, and the solvent is distilled under increasing temperature and vacuum until the pot temperature is 105° C. and the pressure is about 20 mm. Hg and no vapors are condensing. The product weighs 166.5 grams. The product 2-(2,6-dimethyl-4-morpholinothio)benzothiazole melts at 91° C. and contains only a trace of methanol insoluble impurities. The yield is 99% based on benzothiazyl disulfide.

Example III

This example illustrates the synthesis of 2-(2,6-dimethyl-4-morpholinothio)benzothiazole from benzothiazyl disulfide in a solvent mixture of xylene and water. To prepare 2 - (2,6 - dimethyl-4-morpholinothio)benzothiazole, 95.5 grams of 97% assay (0.277 mole) benzothiazyl disulfide, 100 grams xylene, 75 grams water and 67.5 grams (0.585 mole) 2,6-dimethylmorpholine are charged to a one-liter, round-bottom flask equipped with a stirrer, thermometer, reflux condenser, liquid feed tube, and heating mantle. The slurry is stirred and warmed to 61° C., and 210 grams 12.3% (0.347 mole) aqueous sodium hypochlorite is added to the stirring mixture over a twenty-minute period at 61° to 75° C. The mixture is stirred at 75° C. for an additional thirty minutes, then five grams $Na_2SO_3$ in 100 grams hot water is added and the mixture is stirred for five minutes. The mixture is allowed to settle, and the upper layer containing the product and organic solvent is isolated. The product solution is washed twice with 200-gram portions of water at 70° C. The product solution is transferred to a 500-ml. vacuum still. The solvent is distilled from the product under increasing vacuum and temperature until no condensate is obtained at 95° C. and 10 mm. Hg. The product weighs 152 grams and has a crystallization point of 83.2° C. and contains 0.10% ether-insoluble contaminants. The yield is 98% based on benzothiazyl disulfide.

Example IV

This example illustrates the synthesis of 2-(morpholinothio)benzothiazole from benzothiazyl disulfide in a solvent mixture of monochlorobenzene and water. To prepare 2-(morpholinothio)-benzothiazole, 104.5 grams 95.5% assay (0.3 mole) benzothiazyl disulfide, 150 grams monochlorobenzene and 55.5 grams 99% assay (0.63 mole) morpholine are charged to a one-liter, round-bottom flask equipped with a stirrer, thermometer, reflux condenser, liquid feed tube, and heating mantle. The mixture is stirred and warmed to 50° to 55° C. The heat is removed and 208 grams 14.5% (0.405 mole) aqueous sodium hypochlorite is added to the stirring mixture over a 30 to 45-minute period at a temperature of 70° to 75° C. The mixture is then stirred for thirty additional minutes. Five grams $Na_2SO_3$ dissolved in 150 grams water is added, and the mixture is stirred for five minutes. The mixture is allowed to settle, and the lower layer containing the product and monochlorobenzene solvent is separated. The separated product layer is washed twice with 200-gram portions water at 70° to 75° C. The washed product solution is distilled under increasing temperature and vacuum until no condensate is obtained at a pot temperature of 100° C. and 12 mm. Hg. The product weighs 150 grams. The product 2-(morpholinothio)benzothiazole melts at 83° C., and the yield is 99% based on benzothiazyl disulfide.

Example V

This example illustrates the synthesis of 2-(morpholinothio)benzothiazole from 2-mercaptobenzothiazole in a solvent mixture of water, isopropanol and monochlorobenzene. To prepare 2-(morpholinothio)benzothiazole, 86 grams 97% assay (0.5 mole) 2-mercaptobenzothiazole, 120 grams monochlorobenzene, 20 grams isopropanol, and 46.5 grams (0.54 mole) morpholine are charged to a one-liter, round-bottom flask equipped with a stirrer, thermometer, reflux condenser, liquid feed tube, and heating mantle. The slurry is stirred and heated to 50° C. and 336 grams 15% assay (0.675 mole) aqueous sodium hypochlorite is added while stirring over a 30-minute period at 55° to 75° C. Then the mixture is stirred for 30 minutes at 70° to 75° C. Five grams $Na_2SO_3$ in 150 grams hot water is added. The lower layer of product and monochlorobenzene solvent is separated and washed twice with 200-gram portions of water at 65° to 70° C. The washed solution is transferred to a 500-ml. vacuum still, and the solvent is distilled under increasing temperature and vacuum until no condensate is obtained at a pot temperature of 110° C. and 20 mm. Hg. The product 2-(morpholinothio)benzothiazole weighs 119 grams, and the melting point is 86° C. The product is free of either methanol or ether insoluble impurities. The yield is 94.5%

Example VI

This example illustrates the synthesis of N-cyclohexyl-2-benzothiazole sulfenamide from sodium-2-mercaptobenzothiazole in a solvent mixture of monochlorobenzene and water. To prepare N-cyclohexyl-2-benzothiazole sulfenamide, 235 grams 17.8% assay (based on 2-mercaptobenzothiazole) (0.25 mole) sodium 2-mercaptobenzothiazole solution, 28 grams (0.28 mole) cyclohexylamine, 45 grams 25% $H_2SO_4$, and 50 grams monochlorobenzene are charged to a one-liter, round-bottom flask equipped with a stirrer, thermometer, reflux condenser, liquid feed tube, and heating mantle. The slurry is heated to 52° C., and 232 grams 11.3% assay (0.35 mole) aqueous sodium hypochlorite is added while stirring over a 75-minute period at a temperature of 72° C. The mixture is stirred an additional 30 minutes at 72° to 75° C. One gram $Na_2SO_3$ in 50 grams water is added, then 16 grams 10% $H_2SO_4$ is added slowly. The lower layer containing the product and monochlorobenzene is separated and washed twice with 100-gram portions of 70° to 80° C. water. The washed solution is transferred to a 250-ml. vacuum still, and the monochlorobenzene is distilled under increasing temperature and vacuum until no condensate is obtained at a pot temperature of 108° C. and 15 mm. Hg. The product N-cyclohexyl-2-benzothiazole sulfenamide weighs 59 grams, and the crystallization point is 97.5° C. The yield is 90% based on sodium-2-mercaptobenzothiazole.

Example VII

This example illustrates the synthesis of N-tert.-butyl-2-benzothiazole sulfenamide from benzothiazyl disulfide in a solvent mixture of monochlorobenzene and water. To prepare N-tert.-butyl-2-benzothiazole sulfenamide, 104.5 grams 95.5% assay (0.30 mole) benzothiazyl disulfide, 150 grams monochlorobenzene, 25 grams water, and 46 grams (0.63 mole) tert.-butylamine are charged to a one-liter, round-bottom flask equipped with a stirrer, thermometer, reflux condenser, liquid feed tube, and heating mantle and heated to 45° C. The heat is removed, and 242 grams 10.75% (0.35 mole) aqueous sodium hypochlorite is added to the stirring mixture over a 40-minute period at a temperature of 45° to 73° C. The mixture is then stirred an additional thirty minutes at 73° to 75° C. Three grams $Na_2SO_3$ dissolved in 150 grams hot water is added, and the mixture is stirred for five minutes. The mixture is allowed to settle, and the lower layer containing the product and monochlorobenzene solvent is separated. The product layer is washed twice with 200-gram portions of water at 70° to 75° C. The product is then vacuum distilled under increasing temperature and vacuum until no condensate is obtained at a pot temperature of 120° C. and 25 mm. Hg. The product N-tert.-butyl-2-benzothiazole sulfenamide weighs 138 grams, melts at 108° C., and contains 0.40% methanol insoluble material. The yield is 96.5% based on benzothiazyl disulfide.

Example VIII

This example illustrates the synthesis of 2-(hexahydroazepin-1-ylthio)benzothiazole in a solvent mixture of monochlorobenzene and water. To prepare 2-(hexahydroazepin-1-ylthio)-benzothiazole, 96 grams of 97% assay (0.28 mole) benzothiazyl disulfide, 25 grams water, 150 grams monochlorobenzene and 60.5 grams (0.60 mole) hexamethylenimine are charged to a one-liter, round-bottom flask equipped with a stirrer, thermometer, reflux condenser, liquid feed tube, and heating mantle. The slurry is stirred and heated to 50° C. The heat is removed and 242 grams 13.9% (0.45 mole) aqueous sodium hypochlorite is added to the stirring mixture at 50° to 67° C. over a 45-minute period. The mixture is then stirred for 30 minutes at 67° to 75° C. Five grams $Na_2SO_3$ in 150 grams hot water is added to the mixture and stirred for five minutes. The mixture is allowed to settle, and the lower layer containing the product and monochlorobenzene solvent is separated. The product layer is washed twice with 200-gram portions of water at 60° to 70° C. The washed solution is transferred to a 500-ml. vacuum still, and the solvent is distilled until no condensate is obtained at a pot temperature of 100° C. and 15 mm. Hg. The product 2-(hexahydroazepin-1-ylthio)benzothiazole weighs 141 grams, a 95% yield based on benzothiazyl disulfide. The crystallization point of the product is 92.6° C. The product contains 0.20% ether insoluble impurities.

It is intended to cover all modifications of examples chosen for purposes of disclosure which do not constitute departure from the spirit and scope of the invention.

I claim:

1. In a method of making sulfenamides by reacting an organic primary or secondary amine, aqueous sodium hypochlorite, and a thiazole selected from the group consisting of 2-mercapto-benzothiazole, metal salts of 2-mercaptobenzothiazole, and benzothiazyl disulfide, the improvement which comprises forming the sulfenamide by stirring the reactants in a reaction medium of water and water immiscible organic solvent inert to the reactants, the organic solvent being present in a quantity sufficient to substantially dissolve the sulfenamide product at the reaction temperature.

2. The method of making sulfenamides as recited in claim 1, wherein the reaction is carried out at a temperature within the range of about 40° C. to about 100° C.

3. In a method of making sulfenamides by reacting an organic primary or secondary amine, aqueous sodium hypochlorite, and a thiazole selected from the group consisting of 2-mercaptobenzothiazole, metal salts of 2-mercaptobenzothiazole, and benzothiazyl disulfide, the improvement which comprises forming the sulfenamide by stirring the reactants in a reaction medium of water and monochlorobenzene, the monochlorobenzene being present in a quantity sufficient to substantially dissolve the sulfenamide product at the reaction temperature.

4. The method of making sulfenamides as recited in claim 3 wherein the reaction is carried out at a temperature within the range of about 40° C. to about 100° C.

5. The method of making sulfenamides as recited in claim 3, wherein the amine is 2,6-dimethyl morpholine.

6. The method of making sulfenamides as recited in claim 5, wherein the reaction is carried out at a temperature within the range of about 40° C. to about 100° C.

7. The method af making sulfenamides as recited in claim 3, wherein the amine is cyclohexylamine.

8. The method of making sulfenamides as recited in claim 7, wherein the reaction is carried out at a temperature within the range of about 40° C. to about 100° C.

9. The method of making sulfenamides as recited in claim 3, wherein the amine is tertiary butylamine.

10. The method of making sulfenamides as recited in claim 9, wherein the reaction is carried out at a temperature within the range of about 40° C. to about 100° C.

11. The method of making sulfenamides as recited in claim 3, wherein the amine is hexamethylenimine.

12. The method of making sulfenamides as recited in claim 11, wherein the reaction is carried out at a temperature within the range of about 40° C. to about 100° C.

13. The method of making sulfenamides as recited in claim 3, wherein the amine is morpholine.

14. The method of making sulfenamides as recited in claim 13, wherein the reaction is carried out at a temperature within the range of about 40° C. to about 100° C.

15. In a method of making 2-(morpholinothio)benzothiazole by reacting morpholine, aqueous sodium hypochloride and a thiazole selected from the group consisting of 2-mercaptobenzothiazole, metal salts of 2-mercaptobenzothiazole, and benzothiazyl disulfide, the improvement which comprises forming the 2-(morpholinothio) benzothiazole in a reaction medium of isopropanol, water, and monochlorobenzene, the monochlorobenzene being present in a quantity sufficient to substantially dissolve the 2-(morpholinothio)benzothiazole product at the reaction temperature.

16. The method of making sulfenamides as recited in claim 15, wherein the reaction is carried out at a temperature within the range of about 40° C. to about 100° C.

References Cited

UNITED STATES PATENTS 2,581,921  1/1952  Alliger _____ 260—306.6
3,055,909  9/1962  Kinstler et al. _____ 260—306.6

NICHOLAS S. RIZZO, *Primary Examiner.*